United States Patent [19]

Schrum

[11] 4,148,463

[45] Apr. 10, 1979

[54] URGING APPARATUS FOR ELONGATED ARTICLES

[76] Inventor: John P. Schrum, Box 42, Schneider, Ind. 46376

[21] Appl. No.: 823,434

[22] Filed: Aug. 10, 1977

[51] Int. Cl.² ............................................. E21C 29/16
[52] U.S. Cl. ........................................ 254/134.3 FT
[58] Field of Search ............................ 254/105–107, 254/134.3 R, 134.3 FT, 29 R

[56] References Cited

U.S. PATENT DOCUMENTS

| | | | |
|---|---|---|---|
| 2,858,105 | 10/1958 | Lucas | 254/107 |
| 3,601,365 | 8/1971 | Hall | 254/134.3 FT |

*Primary Examiner*—Robert C. Watson

*Attorney, Agent, or Firm*—Neuman, Williams, Anderson & Olson

[57] ABSTRACT

An urging apparatus is provided for moving elongated cables or like articles; the apparatus includes a support trough or shoe in which cables are carried, mounted to an apparatus housing which is reciprocable along a secured housing rail. A cable gripping element engages the cables carried in the support trough when the housing is moving in a first direction, and slips relative to the cables when the housing is moving in a second direction. The apparatus housing is attached to a power assembly which effects reciprocal movement of the apparatus housing and thereby movement of the cable. A plurality of such cable urging apparatus may be placed at spaced intervals along the cables to effectively move an entire cable without stressing or otherwise breaking the cable.

7 Claims, 6 Drawing Figures

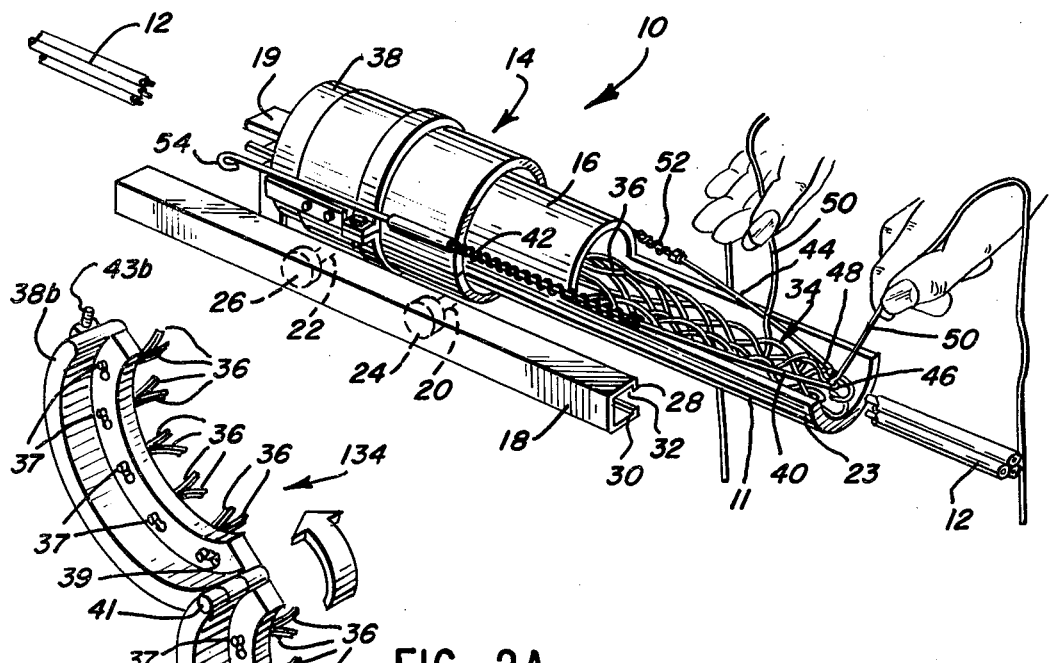

URGING APPARATUS FOR ELONGATED ARTICLES

BACKGROUND OF THE INVENTION

This invention relates to urging apparatus for elongated articles, and more particularly apparatus of the type employed to push or draw elongated cable through buried conduits or across other inaccessible areas.

When laying electrical and/or telephone cables in an underground conduit, for example, it is important to assure that the cable will maintain its electrical continuity once it has been placed within the conduit. Specifically, it is frequently necessary to draw wire between two or more manholes or junction points which are spaced along a buried conduit. If the distance between manholes or junction points exceeds a certain length, there is a risk that a constant pulling and/or pushing force necessary to move the cable through the conduit will rupture the cable and render it ineffective. Thus, merely pulling or pushing the cable through a length of conduit may result in damaged cables or a severing of electrical continuity.

Employing a device which extends through the entire length of a conduit may prevent such risks of damage, but such a device would include a plurality of components resulting in a great multiplicity of parts which may become disassociated, lost or broken. Further, such an arrangement would be difficult to install or remove from a manhole or other restricted space.

To more effectively push or pull cable through conduit over a long distance, a plurality of such apparatus should be adapted to work in conjunction with one another so that a limited amount of force may be applied uniformily along the cable to thereby alleviate the likelihood of damage. To otherwise require the installation and removal of one pulling apparatus in a plurality of manholes to progressively move an elongated cable, would be cost and time-wise inefficient.

OBJECTS OF THE INVENTION

Accordingly, it is an object of the present invention to provide an improved, low cost and simplified urging apparatus for pushing and/or pulling cable or other elongated articles over a long distance without damage.

It is another object of this invention to provide an urging apparatus which is easily installed and/or removed from a manhole or other junction point and which may function with other such urging apparatus to effectively and efficiently urge elongated cables through inaccessible conduit over a long distance.

SUMMARY OF THE INVENTION

These objects are achieved by an urging apparatus according to the invention which includes a support trough or shoe mounted to an apparatus housing; the shoe extends between the housing and the end of a conduit opening into a manhole or junction point. The telephone and/or electrical cable is accommodated in the shoe, and through the housing such that the cable may be diverted into another conduit on a different side of the manhole, or be directed out of the manhole.

The apparatus housing is secured to and is movable along a housing rail, mounted in the manhole. The apparatus housing is adapted for reciprocal movement along the rail and between predetermined limits. A cable gripping element is secured to and extends from the apparatus housing and securely grips the urged cable when the housing is moving in one direction and slides over the cable when the housing is moving in a second direction. A power asembly is attached to the housing to effect reciprocal movement thereof. The power assembly may be adjusted for coordinated urging action with a plurality of urging apparatus mounted in consecutive manhole locations along the cable.

Other objects, advantages and features of the invention will become apparent upon reading the following detailed description and appended claims, and upon reference to the accompanying drawings.

BRIEF DESCRIPTION OF THE DRAWINGS

For a complete understanding of this invention, reference should now be had to the embodiments illustrated in greater detail in the accompanying drawings and described below by way of an example of the invention.

In the drawings:

FIG. 2 is a perspective view of the preferred embodiment of the urging apparatus shown in FIG. 1, with accomodated cables shown in place therein;

FIG. 2a is a fragmentary perspective view of a partially assembled Kellems grip, partially cut-away, shown in an open position.

FIG. 3 is a side view of the urging apparatus of FIG. 2, shown in a first position of movement, and illustrating in phantom lines a second position of movement;

Figure 1:
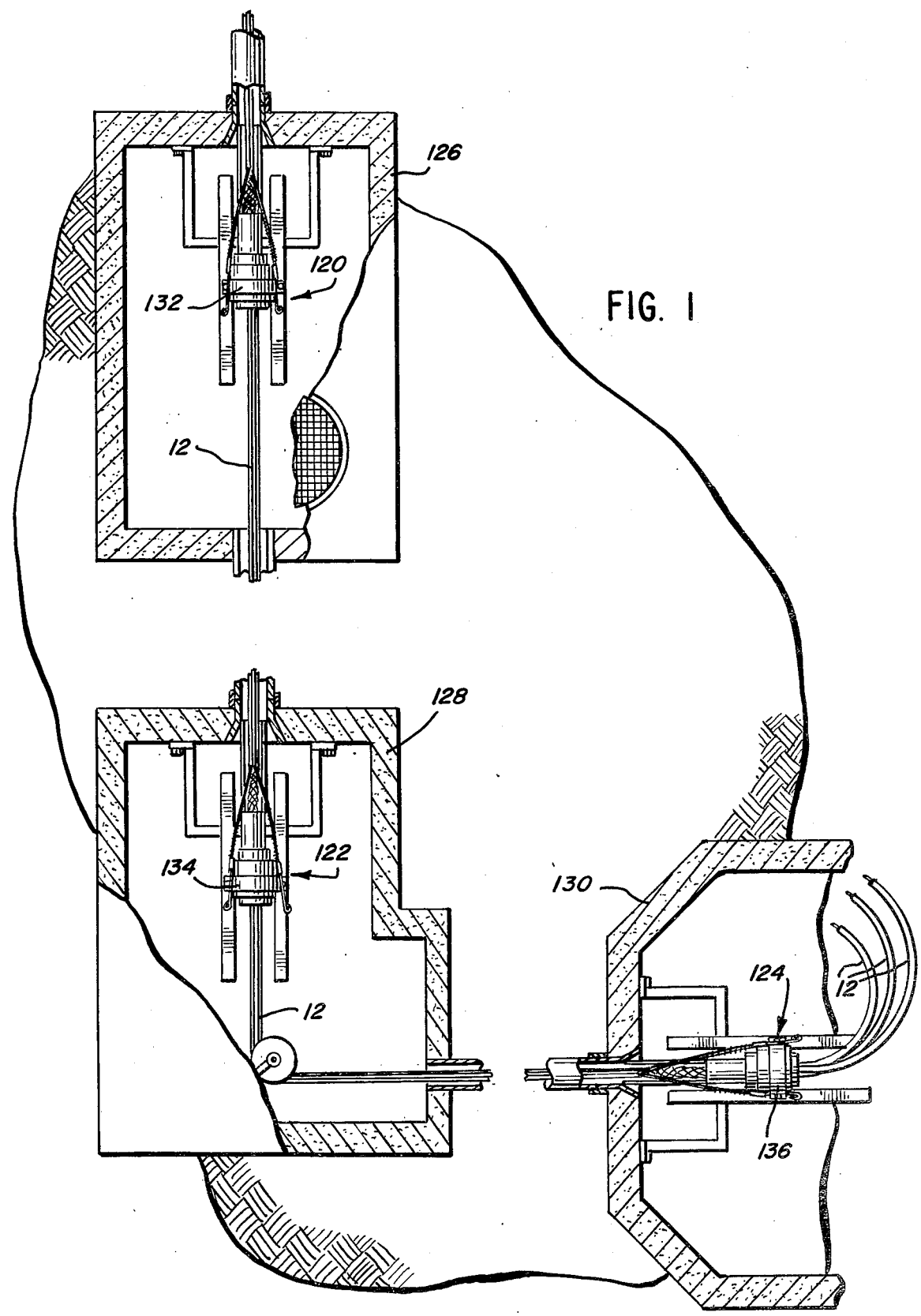
FIG. 1 is a fragmentary top plan view, partially in section, of a plurality of manholes, each having mounted therein urging apparatus employing the teachings cf this invention.

While the invention will be described in conjunction with a preferred embodiment, it will be understood that it is not intended to limit the invention to that particular embodiment. On the contrary, it is intended to cover all alternatives, modifications and equivalents as may be included within the spirit and scope of the invention as defined by the appended claims.

DESCRIPTION OF THE PREFERRED EMBODIMENTS

Turning now to the drawings and principally FIG. 2, the preferred embodiment of a cable urging apparatus according to the invention is shown generally at 10. The apparatus includes a U-shaped support trough or shoe 11 in which cable 12 or another elongated article to be moved, is carried. At end 16 of the shoe 11 is securely accommodated in housing 14 which is adapted for reciprocal movement along rails 18, 19. The rails are securely mounted in the manhole by a support structure 21 (FIG. 3). The opposite end 23 of the shoe 11 is adapted to move in a conduit (not shown) and over the conduit surface. The shoe 11 is preferably molded from a polyethylene material which is sturdy and yet will not inhibit movement of the shoe over the conduit surface. Rollers (not shown) may be incorporated into the end 23 of shoe 11 to facilitate movement of the shoe 11 over the conduit surface. The shoe may be interchanged with a shoe of a different size to meet the dimensions of a conduit opening.

Axles 20 and 22 extend from the underside of housing 14 and are provided with roller bearings 24, 26 on the respective ends thereof, which are accommodated in the C-shaped rails 18, 19. Rail 18, for example, includes opposed flanges 28, 30 which define an opening 32 therebetween which is adapted to accommodate axle 20 and 22 while retaining the bearings 24, 26 in the rail 18.

A cable gripping element 34 is secured at one end 38 to apparatus housing 14 and extends along the shoe 11. The gripping element 34 is a metal basket structure, commonly referred to as a Kellems grip, incorporating a plurality of woven wire strands 36 secured into a basket end plate 38. The end plate 38 is retained in housing 14, with the wire strands 36 extending through a portion of the housing 14 and said shoe 11.

Extending along opposite sides of apparatus housing 14 are basket extender elements 40, 44 which are secured at one end 46, 48 to the distal end of Kellems grip 34. The elements 40, 44 are provided with spring biasing means 42, 52 which bias the elements away from housing 14. In this fashion, tension will be constantly exerted against the Kellems grip 34 such that it will remain substantially taut at all times. The ends 46, 48 of elements 40, 44 are provided with hooks which engage looped wire strands 36 of the basket 34. The tension in the elements 40, 44 may be relieved by manually pulling handles 54 on each element, to thereby facilitate placement or removal of the cable 12 from grip 34.

As shown in FIG. 2a, the Kellems grip 34 may be opened to facilitate placement of a cable 12 therethrough prior to securing it to apparatus housing 14. End plates 38a, 38b are hinged together at hinge piece 41, and are secured in a closed position by closing elements 43a, 43b. It will further be noted that two or more wire strands 36 are joined together into a securing nub 37 which is inserted into the hinged end plates 38a, 38b. The openings 39 in the end plate 38 are keyhole-shaped so that the nubs 37 may be inserted into the end plates 38a, 38b and thereafter "locked" in place. Before the Kellems grip is placed into housing 14, the opening between the wire strand mesh 36 may be closed by securing leather strapping or metal rod 50 therebetween. In this fashion the Kellems grip will be completely secured, with the cable 12 extending therethrough, prior to positioning the Kellems grip into housing 14.

Referring now to FIG. 3, the urging apparatus 10 is mounted on a manhole wall 60 via adjustable support bars 62, 64, 66. In addition, housing rails 18, 19 are maintained in position over the manhole floor (not shown) via support structure 21. The adjustable support bars 62, 64, 66 are provided with a plurality of openings therein 70 by which the height and distance of the housing 14 from a particular conduit opening 72 can be regulated. It is desirable to adjust the support bars such that shoe 11 of the urging apparatus 10 will extend into conduit 74 when housing 14 is moved to its furthest point from the conduit opening 72. Further, the urging apparatus 10 should be at a height such that the shoe 11 and conduit 74 are substantially coaxially aligned.

A power assembly 80 is attached to a housing flange 82 through an arm 84. The arm 84 is pivotally secured to a rotating drive plate 86 which effects reciprocal movement of the arm 84 as it rotates. The drive plate is driven from a motor 88 whose power shaft 90 is attached to a drive shaft 92 via a belt arrangement 94. It should be appreciated that to avoid the risk of a sparkrelated explosion in a manhole (which may include methane gas or the like), the drive arrangement may be modified so that motor 88 is not mounted within the confines of the manhole, or is explosion-proof.

Figure 4:
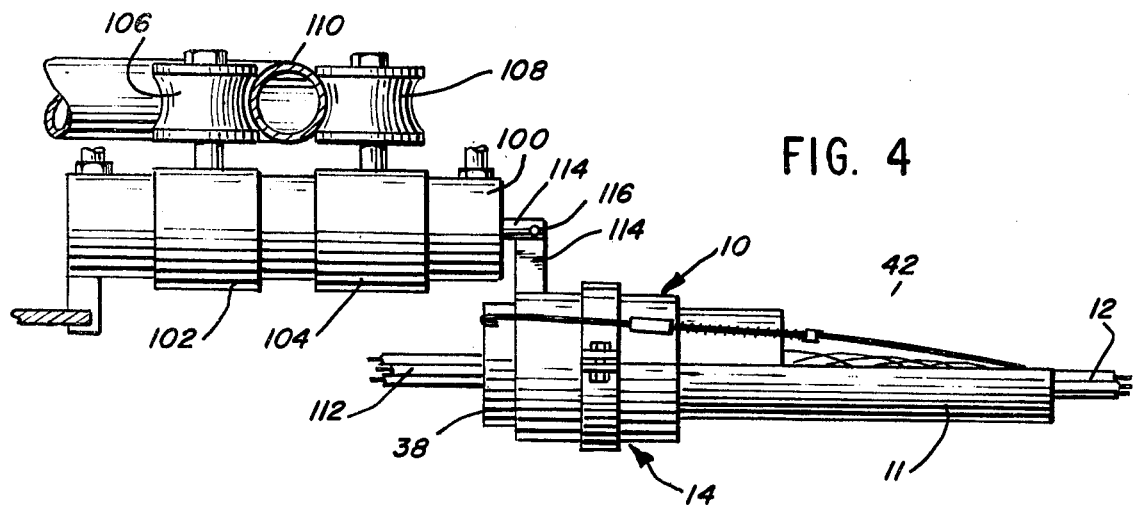
FIG. 4 is a side view, partially in section, of a second embodiment of the urging apparatus of FIG. 2.
Figure 5:
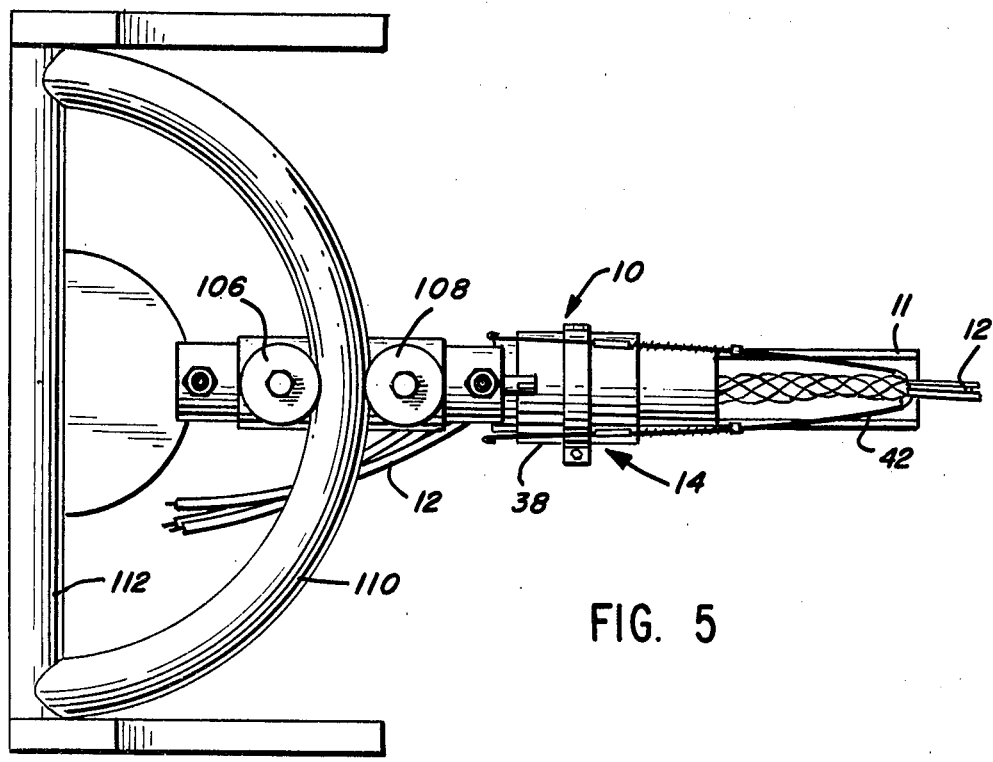
FIG. 5 is a top plan view of the second embodiment of the urging apparatus of FIG. 4.

To facilitate placement of the urging apparatus in alignment with a series of adjacent conduit openings, a modified mounting arrangement as shown in FIGS. 4, 5, may be utilized. In such an arrangement, the rails 18, 19 and roller bearings 22, 24 of FIG. 2 are replaced by a sliding tube 100 movable within tube collars 102, 104. Tube stops 101, 103 are located on the opposite ends of tube 100 and prevent the tube 100 from being removed from collars 102, 104. Concave roller bearings 106, 108 are secured to respective tube collars 102, 104, and accommodate a support tube 110 therebetween, which is anchored to manhole sidewall 112 (FIG. 5). As such, sliding tube 100 may be positioned around the circumference of support tube 110 so as to horizontally align the urging apparatus 10 with one of a series of adjacent conduit openings (not shown).

A vertical positioning hinge 114 extends from sliding tube 100, and is pivotal about pin 116. The hinge is integral with apparatus housing 14 on one end and thereby permits urging apparatus 10 to assume a variety of angles in a vertical plane. As a result, the urging apparatus 10 may be adapted to accommodate cable extending through a plurality of vertically aligned openings adjacent to one another, while remaining in substantial axial alignment with each opening.

In operation, motor 88 (see FIG. 3), through drive plate 86, causes apparatus housing 14 to reciprocate along rails 18, 19. Depending on whether the Kellems grip has been positioned to extend into a adjacent conduit or away from the conduit, the urging apparatus will pull or push cable from or into the conduit. When cable 12 is to be pulled, for example, and the apparatus housing moves in a first direction (see arrow A), the Kellems grip will constrict around cable 12 and pull it from the conduit. When the apparatus housing moves in a second direction (toward its fully inserted position into conduit 74) tension on the cable 12 will be relieved and the Kellems grip and urging apparatus will move over the stationary cable 12. Thus, the cable 12 will be pulled during a portion of the reciprocating movement of the apparatus housing 14. Because the Kellems grip is maintained substantially taut over the cable by arms 40, 44, substantially the entire pull stroke of the apparatus in direction A will effectively pull the cable, with little motion being wasted as necessary to fully extend the Kellems grip.

With reference now to FIG. 1, a predetermined number of urging apparatus 120, 122, 124 may be positioned in adjacent manholes 126, 128, 130, and be coordinated to pull and/or push elongated cables 12 together. To assure that such coordinated motion of the cooperating urging apparatus is achieved, a pneumatically powered reciprocating piston having an associated pressure guage and adjustable pressure valve is utilized as the power assembly. With such an arrangement, if a predetermined piston pressure, more than that set for the pressure valve, is generated due to the cable's resistance to movement as an attempt is made to pull the cable, the pressure valve will be activated and will inhibit the pulling ability of the piston until a lower and desirable pressure level is achieved. In this fashion, if all urging apparatus are equipped with pneumatic power assemblies set for the same piston pressure, they will become coordinated in their pulling effort, as less resistance to cable movement must be overcome when the urging apparatus are pulling together, resulting in a lower and satisfactory piston pressure.

Thus, an urging apparatus is provided that can move one or a plurality of elongated articles through a conduit or the like which is uncomplicated in design. While particular embodiments of the invention have been shown, it will be understood, of course, that the invention is not limited thereto, since modification may be made and other embodiments of the principles of this invention will occur to those skilled in the art to which the invention pertains upon considering the foregoing teachings. It is, therefore, contemplated by the appended claims to cover any such modification and other embodiments as incorporate those features which consititute the essential features of this invention within the true spirit and scope of the following claims.

What is claimed is:

1. Apparatus for moving an elongate flexible article through an elongate recumbent enclosure having open ends, said apparatus comprising: mounting means fixed relative to an open end of said enclosure; housing means carried on said mounting means and movable relative thereto toward and away from said open end; releasable article gripping means carried by said housing means and engaging said article; article support means carried by said housing means and having an elongated portion thereof, shaped and dimensioned for entry into said open end and extension into said enclosure, disposed beneath said gripping means to support said gripping means and an article gripped thereby; and reciprocating means connected to said housing means for causing said housing means, said gripping means and said article support means to move toward and away from said open end, whereby said article support means and gripping means reciprocate in axial alignment with said enclosure and relative to said open end, said gripping means being adapted to engage said article to cause said article to move with said housing means in one direction, while releasing said article to permit movement of said housing means, said gripping means and said support means relative to said article in the other direction.

2. The apparatus of claim 1 wherein said gripping means includes a ring-like member and a flexible netting extending therefrom and conforming substantially to an exterior portion of the article, said ring-like member being hinged and said flexible netting having an opening extending the length thereof, whereby said gripping means may be opened and closed circumferentially about said elongated article.

3. The apparatus of claim 1 wherein said gripping means is a woven sheath of strands secured to said housing means, whereby said sheath of strands contracts and engages said article when said housing moves in said one direction.

4. The apparatus of claim 3 wherein biasing means extends outwardly from said housing and engages the distal end of said gripping means to urge said gripping means to the contracted condition gripping said article and resilient means permitting said biasing means to relax the force on said distal end when said housing is moving in said other direction.

5. Apparatus for moving an elongate flexible article through an elongate recumbent enclosure having open ends, said apparatus comprising; mounting means fixed relative to an open end of said enclosure; housing means carried on said mounting means and movable relative thereto toward and away from said open end; releaseable article gripping means carried by said housing means and engaging said article, said gripping means including a ring-like member, and a flexible netting extending therefrom and conforming substantially to an exterior portion of the article, said ring-like member being hinged and said flexible netting having an opening therein whereby said gripping means may be opened to permit an elongated article to be placed in and removed from the opening provided thereby and closed circumferentially about said elongated article, said flexible netting being a woven sheath of strands secured to said housing means, whereby said sheath of strands contracts and engages said article means when said housing moves in said one direction, biasing means extending outwardly from said housing and engaging the distal end of said flexible netting to urge said flexible netting to the contracted condition gripping said article, and resilient means associated with said biasing means permitting said biasing means to relax the force on said distal end when said housing is moving in said other direction; article support means carried by said housing means, having portions thereof disposed beneath said gripping means to support said gripping means and an article gripped thereby, said portions being shaped to allow it to enter said open end and extend into said enclosure; and reciprocating means connected to said housing means and including a pneumatic piston and a pressure valve for effecting controlled reciprocal movement of said housing means, said gripping means and said article support means, said pressure valve being provided to inhibit the operation of said penumatic piston under predetermined piston pressure effectuated by the inertia of said elongated article, whereby said article support means and gripping means reciprocate in axial alignment with said enclosure and relative to said open end, and said gripping means engages said article to cause said article to move with said housing means in one direction, while releasing said article to permit movement of said housing means, said gripping means and said support means relative to said article in the other direction.

6. A system for moving elongate articles through a plurality of open-ended conduits disposed in end-to-end relation comprising a plurality of elongate article moving apparatus situated at the ends of open-ended conduits disposed in end-to-end relation, each apparatus comprising mounting means fixed at or between the ends of one or more of said conduits respectively, housing means carried on said mounting means and reciprocable relative to said end or ends, releaseable article gripping means attached to said housing means for engaging an elongate flexible article, article support means attached to said housing means and disposed beneath said gripping means to support said gripping means and an article gripped thereby, reciprocating means for causing said housing means, said gripping means and said article support means to reciprocate in relation to said end or ends and automatic deactivation means connected to said reciprocating means for inhibiting the reciprocable movement of said housing means, said article gripping means, and said article support means upon the occurrence of predetermined conditions whereby said apparatus exert axial forces on an article in unison.

7. A method for moving elongated flexible articles through a plurality of axially aligned open-ended conduits comprising the steps of:
(1) installing a plurality of article moving apparatus in relatively spaced relation at or between the respective ends of one or more individual conduits, at least one of said apparatus being in proximal relation to said article and reciprocating relative thereto moving said article through said conduit and into said proximal relation with another said article moving apparatus which also engages and reciprocates relative to said article;

(2) adjusting respective deactivation means of each apparatus to be responsive to an increase in the inertia of said article brought about by the asynchronous movement of said apparatus in relation to said other apparatus whereby said apparatus reciprocate relative to said article in a synchronous manner; and (3) activating a predetermined number of said apparatus whereby said apparatus effectuate synchronous movement of said elongate article.

* * * * *